United States Patent Office 3,446,626
Patented May 27, 1969

3,446,626
METHOD FOR PREPARING A BROMELAIN SOLUTION FOR ANTE-MORTEM INJECTION
John K. McAnelly, 405 Sherman St., Park Forest, Ill. 60466, and William D. Warner, 900 Kemman, La Grange Park, Ill. 60525
No Drawing. Filed Aug. 25, 1966, Ser. No. 574,955
Int. Cl. A22c; C12d *13/10*
U.S. Cl. 99—107     5 Claims

ABSTRACT OF THE DISCLOSURE

Bromelain is treated to produce an enzyme solution suitable for ante-mortem injection into animals to effect subsequent tenderization of the flesh. A bromelain solution is first adjusted to about pH 7.5 or higher and held for at least six hours, whereafter the solution is treated with an oxidizing agent. The result is a relatively high yield of enzyme active for tenderizing purposes with a minimum of fractions that may cause side effects in animals.

---

The present invention relates generally to an improved method for the preparation of enzyme solutions suitable for an ante-mortem injection, and more particularly to a method for preparing a solution of bromelain which will produce desirable ante-mortem tenderization upon injection without producing the undesirable side effects heretofore experienced.

Tenderization of meat by the technique of ante-mortem enzyme injection was first disclosed in U.S. Patent No. 2,903,362 to Beuk et al., issued Sept. 8, 1959. In this technique, an amount of a solution of a plant-derived proteolytic enzyme is injected into the animal, preferably through the jugular vein, and the animal is held for a period of time prior to slaughtering. During the holding period, the enzyme is carried by the vascular system throughout the animal resulting in a uniform tenderization greatly superior to that obtained by prior art techniques such as post-mortem stitch pumping.

Although ante-mortem injection has gained substantial acceptance in the industry, difficulties exist in that there is a tendency (upon cooking) for glandular tissues such as the heart, liver, and kidneys to become over-tenderized by certain enzymes, such as papain, probably because such enzymes leave a tenderizing potential over a relatively wide cooking-temperature range; and also because such organs tend to collect larger quantities of enzyme or blood containing enzyme than muscle tissue.

Further, internal hemorrhaging and edema of the organs as well as other undesirable physiological side effects may occur in the ante-mortem injected animals as a result of unnnown components present in many enzyme materials, sauch as bromelain and some papains, and subsequently in the enzyme solution injected into the animal.

Recent purification techniques have diminished the latter undesirable feature to a degree. For example, U.S. Patent No. 3,052,551 to Hogan, issued Sept. 4, 1962, discloses a method whereby enzyme solutions are purified by reversible oxidation combined with salt fractionation. More recently, a highly improved technique for eliminating physiological side effects in animals through reversible oxidation combined with certain critical pH adjustments has been employed. The latter technique is of great value for this purpose with all plant-derived proteolytic enzymes and no undesirable side effects are experienced when preparing solutions of papain and ficin. However, purification of bromelain by this technique, while capable of eliminating the physiological side reactions in animals to a degree, has been shown to be undesirable in that as much as 70% of the tenderizing activity of the bromelain enzyme is destroyed. And bromelain is a highly desirable enzyme for ante-mortem treatment of meat animals because it has been found to overcome, to a great degree, the problem of overtenderized organs—probably due to a narrower activity range temperaturewise, and also due to some selectivity of meat tissues affected.

Therefore, it is an object of the present invention to provide an improved method for preparing a bromelain solution useful in ante-mortem treatment of meat bearing animals.

It is a further object of the present invention to provide a method for preparing a bromelain solution without destroying the tenderizing potential of the enzyme, but which will eliminate undesirable physiological side effects ordinarily experienced in the ante-mortem injection of such solutions.

It is a further object of the present invention to provide a bromelain solution having substantially its full tenderizing potential without having the property of producing undesirable physiological side effects.

Additional objects of the present invention, if not specifically set forth herein, will be readily apparent to those skilled in the art from a reading of the following detailed description of the invention.

Surprisingly, it has been found that combination of certain critical holding periods with critical pH adjustment will result in the elimination of the factors causing the undesirable physiological side effects without reducing the enzyme tenderization potential of bromelain solutions. More particularly, it has been found that if the pH of a bromelain solution prepared by standard methods is adjusted to about 7.5 and the solution is held for at least 6 hours, and preferably from about 18 to about 24 hours, prior to reversible oxidation by methods such as hydrogen peroxide-catalase treatment, the desired results are obtained. On the contrary, if the solution is not held for the required period of time after pH adjustment and prior to reversible oxidation the tenderizing ability of the bromelain solution will be substantially reduced. It is to be understood that there is an importance attached to the disclosed relative pH levels. However, one skilled in the art will understand that the usual enzyme materials are not pure, but are systems, including other naturally occurring and sometimes added compounds, which display some, and often significant, variations in sensitivity to pH. Accordingly, the precise pH values disclosed herein should be construed as being subject to some variation consonant with the particular enzyme system utilized.

Although several variations are employed at the present time, starting enzyme solutions are generally prepared by first forming a paste of the commercial plant-derived proteolytic enzyme with water-soluble liquids such as glycerine, glycols, or other water-soluble or water-dispersible wetting agents. A working solution is then prepared from this paste by dissolving the paste in water at a temperature of from about 10–15° C. This method is generally employed in the preparation of the solutions used in the present invention, although it will be understood that other techniques will be readily apparent to those skilled in the art and are equally suitable.

The improved method of the present invention comprises initially the adjustment of the pH of a solution prepared by the above manner or other technique to at least 7.5 and generally not above 10.0 Practical restrictions such as enzyme instability usually render it difficult to employ a pH much above 9.5. Preferable results are obtained using a pH within the range of from about 8.0 to about 8.5.

After adjustment of the enzyme solution to within the above-noted range, it is highly critical that the solution then be maintained at the required pH for at least 6 hours, and preferably from about 18 to about 24 hours. This inactivates certain fractions of the enzyme. Holding of the solution at the required pH for more than about 48 hours, although not detrimental, does not appear to produce any noticeable improvement.

After maintaining the enzyme solution at the critical pH for the required time, the enzyme solution is further reversibly inactivated, preferably by a hydrogen peroxide-catalase treatment. Although the hydrogen peroxide-catalase treatment is used in the following examples, it will be understood that other techniques are also suitable and have been described in the prior art, for example, in U.S. Patent No. 3,052,551 to Hogan. Subsequent to the reversible inactivation treatment, this solution may be immediately used or kept frozen until injection.

As the pH of the blood of a live animal is within the range of approximately 5.0–7.4, it may be desirable to adjust the pH of the enzyme solution to within this range prior to injection. However, this latter pH adjustment is not critical and is not critical in the present method.

The method employed in using the enzyme solution for ante-mortem injection has been previously described in the above-noted patents to Beuk and Hogan. Briefly, this method involves the injection of about 0.1–150 mg. per pound of body weight into the vascular system of the animal and holding the animal for a period of time sufficient to obtain uniform distribution of the enzyme prior to slaughtering.

In the following explanations and the examples, reference will be made to the milk clotting method and to information derived therefrom. This method has been cited in the literature as a test for proteolytic potency of enzyme solutions and is a determination of the length of time it takes a solution of the given enzyme to denature and hydrolyze milk protein. In the practice of this method an amount of enzyme solution is added to a solution containing milk protein and the time required to form a protein precipitate, or "milk clot," is measured. By definition a milk clot unit is that amount of enzyme in one milliliter that will cause 5 milliliters of substrate to clot in 60 seconds. The normal milk clot method is employed without the use of reducing agents, such as cysteine, glutathione, etc.

Hereinafter, the normal milk clot method will be referred to as the Non-Reducing Milk Clot Method and has been performed as follows: One ml. of enzyme solution is incubated with five mls. of skimmed milk at 40° C. The time in seconds required for clotting to occur is inversely proportional to the enzyme activity. Most accurate results are obtained when the enzyme concentration is adjusted to give a clotting time of 30–60 seconds. A Non-Reduced Milk Clot unit can be calculated by the following equation:

$$\text{N-RMCU/ml.} = 60E/t$$

$t$ = the clotting time in seconds.
$E$ = dilution factor, i.e., how many times the original enzyme solution was diluted in order that the milk will clot in 30–60 seconds.

(Usually it isn't known how much enzyme is present in a crude mixture. Therefore the enzyme activity is measured on the "per ml." basis.)

The substrate of this test is prepared by mixing together 80 grams of skim milk powder, 340 ml. of deionized water and 6 ml. of 4.0 molar $CaCl_2$ until the milk powder is completely solubilized. Five ml. of this solution is then aliquoted per tube and the solution is tempered at 40° C. before using. The enzyme solution is then diluted to yield the activity sufficient to give a clotting time of 30–60 seconds and tempered to 40° C. The Non-Reduced Milk Clot method then shows the proteolytic potency in the solution under oxidized conditions.

Determination of the proteolytic potency of completely or nearly completely reduced enzyme solutions is measured through the addition of reducing agents such as cysteine or glutathione to the milk and the enzyme solution prior to performing the assay.

Hereinafter, this reduced solution method will be referred as the Reduced Milk Clot Method. Assay procedure in this instance is as follows: One ml. of properly diluted enzyme solution is incubated with 5 ml. of skim milk at 40° C. The time in seconds required for clotting to occur is inversely proportional to the enzyme activity. Again, the enzyme concentration should be adjusted to give a clotting time of 30–60 seconds for the most accurate results. Calculation of the Reduced Milk Clot unit is by the following equation:

$$\text{RMCU/ml.} = 60E/t$$

$t$ = the clotting time in seconds.
$E$ = dilution factor.

The milk substrate for the RMCU Method is prepared by mixing 80 grams of skim milk powder, 290 ml. of deionized water, 6 ml. of 4.0 molar $CaCl_2$ and 50 ml. of a 0.1 molar cysteine-0.01 molar Versene solution, the latter adjusted to pH 6, until complete solubilization of the skim milk powder is obtained. Five ml. of this solution is then aliquoted per test tube and the tubes are tempered to 40° C. before use. The enzyme solution is then prepared by mixing 10 ml. of the properly diluted enzyme solution and 10 ml. of a 0.2 molar cysteine-0.01 molar Versene solution at a pH of 6.0 and allowing the mixture to stand for 5 minutes. The mixture is then diluted to 100 ml. with deionized water and the final solution is tempered to 40° C. before performance of the tests.

As the Reduced Milk Clot unit is proportional to the amount of enzyme activity, determination of this figure is a direct indication of the amount of reduction of such enzyme activity during purification. In enzyme solutions prepared as indicated above the Non-Reduced Milk Clot value is, as previously stated, related to the undesirable physiological side effects in an ante-mortem injected animal. Reduction in this value will normally reduce such physiological side effects. As will be illustrated in the following examples, the present method results in a substantial decrease in the N-RMCU to a value of less than one-quarter of its original value while at the same time showing no substantial decrease in the total RMCU.

The following examples are given as illustrative of the present process and the results derived therefrom. The examples should be considered as illustrative only and not in any way limiting the scope of the present invention.

EXAMPLE I

The following example is illustrative of relation of the decrease of N-RMCU to the decrease in physiological reaction. In this example, rabbits are injected in the ear vein with the enzyme solution at levels comparable per pound of live weight to that which a beef animal would receive. Cattle and sheep receive the enzyme solution via the jugular vein. Rabbits are used mainly for the physiological reactions test work because of the lower expense and the possibility of performing more tests per day than with cattle or sheep. Sheep are used in the example because of their closer resemblance to beef. In addition, the cuts of meat obtained from the sheep are larger and are better suited for tenderness panel evaluation.

Physiological reaction is determined by post-mortem autopsy after sacrifice of the animal within 20–30 minutes after injection. The important autopsy criteria include hemorrhage of the heart, kidneys, gall bladder, diaphragm and viscera. The scale used in determining the degree of severity is from 0 to 4+ (0 denoting no gross abnormalities, 4+ denoting very marked gross abnormalities).

The solutions used in this example were prepared by mixing 120 grams of food grade bromelain and 120 grams of C.P. gycerine and bringing the volume of the mixture to 3,000 ml. by the addition of cold (15° C.) distilled water. Approximately 50 grams of Hy-Flo Super Cel was stirred into the solution and the solution was filtered through a layer of Hy-Flo supported on E&D #617 filter paper in a Buchner funnel. The clarified enzyme solution was divided into two batches of approximately 1,000 ml. and 2,000 ml. The pH of the smaller batch was adjusted to 5.0 with 5 N HCl from the normal pH of 5.6–5.8. The Reduced Milk Clot test was performed and the solution was diluted with distilled water to 40 RMCU ml. To the solution then was added 0.9% W/V NaCl and the solution was sterilized by passing through a Seitz sterilizing filter. The pH of the 2,000 ml. batch was adjusted to pH 8.0 with 5 N NaOH and the solution was held for 24 hours at 15° C. The solution was then divided into two batches of approximately 1,000 ml. each. One of the batches received no $H_2O_2$, while 0.1 ml. of 30% $H_2O_2$ per liter of enzyme solution was added to the other batch. The $H_2O_2$ treatment was followed by the addition of 0.2 mil of catalase per liter of enzyme solution to destroy residual peroxide. Both solutions were assayed for Reduced Milk Clot unitage, diluted to 40 RMCU per ml. and sterilized as above. All solutions were kept frozen until injected.

These solutions were injected at levels of 0.5 ml. per pound live weight of rabbits and 0.25 ml. per pound live weight for sheep. The results obtained are as follows:

| Treatment | Non-reduced milk clot units/ml. | Physiological reaction | |
|---|---|---|---|
| | | Rabbits | Sheep |
| No treatment | 23 | 4 | 3 |
| Held 24 hours at pH 8.0 | 2 | 2+ | 1+ |
| Held 24 hours at pH 8.0, $H_2O_2$ added at 24 hours | <1 | 0–1 | 0–1 |

EXAMPLE II

The following example shows the effect of various holding times at various pHs upon the reduction of the RMCU and N-RMCU. It will be understood that in commercial application of the present process, the enzyme solution would normally be reversibly inactivated at the time assay is performed in this example.

In this example, several batches of bromelain solution were prepared by mixing 20 grams of food grade bromelain with 20 grams of C.P. glycerine. The slurry thus formed then was diluted to 500 ml. by the addition of cold (15° C.) distilled water. The pH of the individual batches then was adjusted from the normal 5.6–5.8 to the pHs designated below by the addition of 5 N CHl or NaOH. Ten grams of Hy-Flo Super Cel was added to each batch and the batches were clarified by passage through Hy-Flo supported on E&D #617 filter paper in a Buchner funnel. The solutions then were held at 15° C. Reduced and Non-Reduced Milk Clot assays were performed at the times specified below with the following results:

| pH time (hours) | 5.0 | | 6.0 | | 7.0 | | 8.0 | |
|---|---|---|---|---|---|---|---|---|
| | RMCU | N-RMCU | RMCU | N-RMCU | RMCU | N-RMCU | RMCU | N-RMCU |
| 0 | 68.1 | 39.0 | 67.2 | 31.0 | 64.9 | 22.9 | 67.2 | 13.5 |
| 3 | 66.0 | 36.9 | 54.6 | 23.1 | 61.8 | 16.5 | 58.0 | 7.4 |
| 6 | 61.6 | 34.8 | 30.7 | 10.2 | 60.6 | 12.0 | 55.6 | 4.9 |
| 24 | 55.0 | 28.9 | 20.2 | 1.9 | 54.8 | 8.9 | 53.5 | 2.6 |

EXAMPLE III

The rapidity with which the Non-Reduced Milk Clot values will drop is not only dependent on the pH of the solution, but also upon the temperature at which the solution is held, and the length of time at which the solution is maintained at the particular pH and temperature. The following data will illustrate the inter-relationship of these three factors.

In these examples, solutions of bromelain were prepared by the procedure given in the preceding examples and all solutions were adjusted to pH 8.0. The beakers of the solutions were placed in water baths maintained at the temperature indicated. The following results were obtained:

| Temp., °C. | Milk clot units/ml. | Time | | | | | |
|---|---|---|---|---|---|---|---|
| | | Min. | | Hours | | | |
| | | 0 | 10 | 2 | 4 | 16 | 24 |
| 10 | Reduced | 54.5 | | | | 53.6 | 53.3 |
| | Non-reduced | 17.7 | | | | 8.9 | 7.3 |
| 15 | Reduced | 74.0 | | | | 53.4 | 50.4 |
| | Non-reduced | 15.8 | | | | 6.3 | 3.5 |
| 20 | Reduced | 54.5 | | | | 52.2 | 45.8 |
| | Non-reduced | 18.8 | | | | 4.4 | 4.3 |
| 30 | Reduced | 69.0 | | 69.0 | 67.0 | | |
| | Non-reduced | 18.0 | | 5.0 | 2.0 | | |
| 40 | Reduced | 63.0 | | 49.0 | | | |
| | Non-reduced | 25.0 | | 2.0 | | | |
| 50 | Reduced | 66.0 | | 37.7 | | | |
| | Non-reduced | 15.0 | | 1.0 | | | |
| 60 | Reduced | 52.0 | 34.0 | | | | |
| | Non-reduced | 20.0 | 3.0 | | | | |
| 70 | Reduced | 52.0 | 13.0 | | | | |
| | Non-reduced | 20.0 | 1.0 | | | | |

It is observed from the above data that the time required to reduce the N-RMCU values decreases rapidly as the temperature is increased from 10° C. to 70° C. As a practical consequence, however, the higher temperatures do not readily lend themselves to practical commercial operation because of the very exact conditions which must be followed. In addition, at 22–40° C. rapid microbial growth and subsequent destruction of the enzyme may occur. For these reasons, it is preferred to use a temperature of between 10° and 20° C. in the present method. This temperature range, of course, will be subject to some variation because of variations in the concentration of the enzyme solutions and variations in time, temperature, and pH, in a manner which will be readily recognizable by one skilled in the art.

EXAMPLE IV

In addition to the above illustrated effects of pH, temperature, and time, it has been noted that the addition of hydrogen peroxide to the solutions in certain concentrations after the critical holding time will cause further reduction of the Non-Reduced Milk Clot values. In opposition to prior art, it has been found that the bromelain solution must be held at the proper pH for a sufficient length of time before the addition of hydrogen peroxide or great reductions in proteolytic potency will occur. The effect of the addition of the $H_2O_2$ at the various times will be illustrated in this example.

The bromelain solutions herein used were prepared as in the previous examples. The pH was adjusted to either 5.0 or 8.0 and the beakers of solution were placed in a water bath at 15° C. At the time periods indicated, the examples were withdrawn for milk clot analysis and 0.1 ml. of 30% $H_2O_2$ per liter of solution was added. Catalase was added after 10 minutes to remove excess peroxide and the solutions were analyzed for milk clot values. The following results were noted:

| Hours | pH 5 | | | | pH 8 | | | |
|---|---|---|---|---|---|---|---|---|
| | Without $H_2O_2$ | | With $H_2O_2$ | | Without $H_2O_2$ | | With $H_2O_2$ | |
| | RMCU | N-RMCU | RMCU | N-RMCU | RMCU | N-RMCU | RMCU | N-RMCU |
| 0 | 68.1 | 39.0 | 26.8 | 6.0 | 67.2 | 13.5 | 24.8 | |
| 3 | 66.6 | 36.9 | 21.0 | 4.7 | 58.0 | 7.4 | 31.0 | |
| 6 | 61.6 | 34.8 | 20.5 | 2.7 | 55.6 | 4.9 | 34.8 | |
| 24 | 55.0 | 28.9 | 19.9 | 3.2 | 53.5 | 2.6 | 48.2 | |

It is to be observed from the above results that holding the enzyme solution at pH 5.0 does not stabilize the total proteolytic activity against the action of $H_2O_2$. Conversely, at pH 8.0 the activity becomes stabilized towards the action of $H_2O_2$ somewhere between 6 and 24 hours. Also, the Non-Reduced Milk Clot values of solutions held at pH 8.0 are lower initially than at pH 5.0 and these values decrease during a 24 hour period, whereas at pH 5.0 these values diminish very slightly.

EXAMPLE V

This example illustrates the variation and susceptibility of the Reduced Milk Clot value to peroxide treatment in different enzyme powders. In addition, this example further illustrates the effect of the $H_2O_2$ level upon the reduction of the RMCU and N–RMCU.

In this example, 2–4% bromelain solutions from two different powders were prepared as in the previous examples. The pH of the solutions was adjusted to 8.0 and the solutions were held 24 hours at 15° C. Thereafter, the solutions were subdivided into several smaller lots and the desired amount of 30% $H_2O_2$ was added to each solution. After 10 minutes, catalase was added to destroy excess peroxide and milk clot assays were performed on each solution. The following results were obtained:

| Powder | $H_2O_2$ level (ml./L. solution) | RMCU/ml. | N–RMCU/ml. |
|---|---|---|---|
| A | 0 | 52.0 | 4.5 |
|   | .1 | 41.1 | 1 |
|   | .2 | 39.7 | 1 |
|   | .4 | 38.4 | 1 |
| B | 0 | 86.5 | 1.8 |
|   | .02 | 87.3 | 1.8 |
|   | .1 | 82.0 | 1 |
|   | .2 | 79.0 | 1 |
|   | .4 | 84.1 | 1 |
|   | 2.0 | 75.5 | 1 |

The above results show that the two powders were affected differently by the addition of peroxide. Thus, the total activity of Powder A was reduced to a much greater extent than was the case with case B. Additionally, the Non-Reduced Milk Clot value for powder A was much higher than for powder B at the end of 24 hours. However, this latter value could be reduced to less than 1.0 by the addition of sufficient $H_2O_2$. The results with powder B show that levels of peroxide up to 20 times as is needed to lower the Non-Reduced Milk Clot values below 1 have little effect upon the reduced activity of this powder as did the lowest level of peroxide used with powder A.

Obviously many modifications and variations of the invention as hereinbefore set forth may be made without departing from the spirit and scope thereof, and therefore only such limitations should be imposed as are indicated in the appended claims.

We claim:

1. A method for preparing a bromelain solution suitable for ante mortem injection comprising: adjusting the pH of a bromelain solution to at least about 7.5; holding the solution at said pH for at least about six hours to at least partially eliminate certain fractions of the enzyme which cause undesirable physiological side effects while maintaining a high level of tenderizing potential; and thereafter adding an oxidizing agent to the enzyme present in the solution.

2. The method of claim 1, wherein the bromelain solution is maintained for from about 18 to about 48 hours at a temperature of from about 10° to about 20° C.

3. The method of claim 1, wherein the solution is adjusted to a pH within the range of about 8.0 to about 8.5.

4. The process of claim 1, wherein the solution is held at a pH of from about 8.0 to about 8.5 for from about 18 to about 24 hours at a temperature of about 10° to about 20° C.

5. The process of claim 1 wherein the oxidizing agent is an amount of hydrogen peroxide equivalent to at least 0.02 ml. of 30% hydrogen peroxide per liter of enzyme solution and is followed by the addition of sufficient catalase to destroy residual peroxide.

References Cited

UNITED STATES PATENTS 3,052,551   9/1962   Hogan _____ 99—107

HYMAN LORD, *Primary Examiner.*

U.S. Cl. X.R.

195—66